United States Patent
Park (12)

(10) Patent No.: US 6,321,869 B1
(45) Date of Patent: Nov. 27, 2001

(54) SPEAKER SYSTEM FOR PERSONAL COMPUTERS

(75) Inventor: Min-Su Park, Seoul (KR)

(73) Assignee: Il Sung International Co., Ltd., Kwangju-Gun (KR)

( * ) Notice: Subject to any disclaimer, the term of this patent is extended or adjusted under 35 U.S.C. 154(b) by 0 days.

(21) Appl. No.: 09/626,101

(22) Filed: Jul. 26, 2000

(30) Foreign Application Priority Data

Feb. 22, 2000 (KR) .................................................. 00-4853

(51) Int. Cl.[7] ............................. A47B 81/06; B01D 50/00
(52) U.S. Cl. ........................ 181/199; 381/306; 55/385.2
(58) Field of Search .................................. 181/141, 199; 381/300, 306, 394, 388, 186; 361/681, 683, 687, 688, 690, 694, 695; 55/385.2, 385.6; 96/27

(56) References Cited

U.S. PATENT DOCUMENTS

| | | | |
|---|---|---|---|
| 4,811,403 | * 3/1989 | Henricksen et al. | 381/186 |
| 5,213,595 | * 5/1993 | Kim | 55/385.2 |
| 5,446,793 | * 8/1995 | Piccaluga et al. | 181/199 |

* cited by examiner

*Primary Examiner*—Khanh Dang
(74) *Attorney, Agent, or Firm*—Abelman, Frayne & Schwab

(57) ABSTRACT

A speaker system for personal computers is disclosed. The speaker system has at least one speaker used for amplifying audio signals to predetermined levels and stereophonically dividing the amplified audio signals, and outputting sounds having an audio frequency. A power supply unit supplies electric power for the speaker while converting and rectifying an input AC voltage into a desired level of DC voltage. A speaker power switch is provided on the cabinet of the speaker for turning on or off the electric power for the speaker or for controlling output sound volume of the speaker. A drive fan is installed within the speaker and is rotated at a predetermined rpm when the speaker is turned on. This drive fan thus generates sucking force for forcibly sucking atmospheric air into the speaker. An anionizer is mounted on a printed circuit board within the speaker and generates anions from its anionizing plate, which consists of an anode plate and a cathode plate individually generating a high voltage. An anionizer power switch is provided on the speaker for turning on or off the anionizer. An air filter is installed around the drive fan within the speaker so as to filter off impurities from sucked atmospheric air.

5 Claims, 3 Drawing Sheets

SPEAKER SYSTEM FOR PERSONAL COMPUTERS

BACKGROUND OF THE INVENTION

1. Field of the Invention

The present invention relates to a speaker system for personal computers and, more particularly, to a speaker system for such computers designed to filter and clean contaminated air of a limited working space around the computer in addition to anionizing the air.

2. Description of the Prior Art

As well known to those skilled in the art, desktop personal computers have been widely used in houses and offices for performing communications, word processing or games. Such desktop personal computers are not designed to be easily portable and typically have somewhat large volumes and heavy weight, and so they have to be installed on desks having limited areas and spaces and force users to use them at fixed places within limited working spaces different from portable computers, such as laptop computers or palmtop computers.

The construction of a conventional desktop computer is shown in FIG. 1. As shown in the drawing, the conventional desktop computer 1 comprises a main body 2, which is fabricated with a CPU, a hard disc drive and a floppy disc drive set within a casing. A monitor 3 is electrically connected to the main body 2 and displays images on its screen under the control of the CPU. A keyboard 4, used as an input instrument for the computer, is electrically connected to the main body 2. The computer 1 also typically has a speaker system 5, which consists of at least one speaker and amplifies audio signals output from the main body 2 and generates sounds in response to the audio signals.

Nowadays, such a personal computer 1 has been designed to have multimedia functions and is operated in conjunction with a variety of peripheral instruments, such as a mouse and a printer. Particularly, the main body 2 of the computer 1 is provided with a variety of electronic devices capable of allowing the computer 1 to perform desired multifunctional operations. Therefore, it is necessary to more highly integrate the electronic devices for such computers 1.

Recently, in accordance with a quick and high development of the information society, such personal computers 1 are more widely and preferably used day by day. In addition, the Internet communication allows people to quickly and easily perform information interchange, and so the necessity of such computers has been rapidly increased. At any rate, a variety of new businesses, forcing people to use such personal computers 1, have been developed day by day, and so most modern day people inevitably consume a great amount of time in operating such computers 1.

When a user operates a personal computer 1 for a lengthy period of time within limited working space having a problem of bad ventilation, the surrounding air may be contaminated with smoke and germs and may suffer a lack of oxygen, and gives ill effect to the user's health. It is thus necessary to overcome such a problem experienced while operating computers within such limited working space for a lengthy period of time.

SUMMARY OF THE INVENTION

Accordingly, the present invention has been made keeping in mind the above problems occurring in the prior art, and an object of the present invention is to provide a speaker system for personal computers, which is designed to suck contaminated air from limited working space and to filter off impurities from the air using an air filter, thus cleaning the contaminated air, and also has an anionizer designed to anionize the filtered air, thus preparing anionized clean air to a user of a computer and effectively preventing a user's health from being ill-affected by such contaminated air.

Another object of the present invention is to provide a speaker system for personal computers, of which the audio signal amplifying chip is mounted to a cathode plate of the anionizer, with the cathode plate being capable of desirably absorbing heat using a high voltage, and which effectively cools the audio signal amplifying chip and minimizes the resistance value of the chip caused by an undesirable heat dissipation from the chip, thus being finally improved in its tone quality.

In order to accomplish the above objects, the present invention provides a speaker system for personal computers, comprising at least one speaker amplifying audio signals, output from a personal computer, to predetermined levels and stereophonically dividing the amplified audio signals, and outputting sounds having an audio frequency. A power supply unit supplies electric power for the speaker while converting and rectifying an input AC voltage into a desired level of DC voltage. The speaker system also has a speaker power switch, which is provided on the cabinet of the speaker for turning on or off the electric power for the speaker so as to selectively activate the speaker or for controlling output sound volume of the speaker. A drive fan is installed within the speaker and is rotated at a predetermined rpm when the speaker is turned on. This drive fan thus generates sucking force for forcibly sucking atmospheric air into the speaker. An anionizer is mounted on a printed circuit board within the speaker and is used for generating anions from its anionizing plate, which consists of an anode plate and a cathode plate individually generating a high voltage. An anionizer power switch is provided on the speaker for turning on or off the anionizer. The speaker system further comprises an air filter, which is installed around the drive fan within the speaker so as to filter off impurities from the sucked atmospheric air.

BRIEF DESCRIPTION OF THE DRAWINGS

The above and other objects, features and other advantageous of the present invention will be more clearly understood from the following detailed description taken in conjunction with the accompanying drawings, in which.

DETAILED DESCRIPTION OF THE INVENTION

Figure 1:
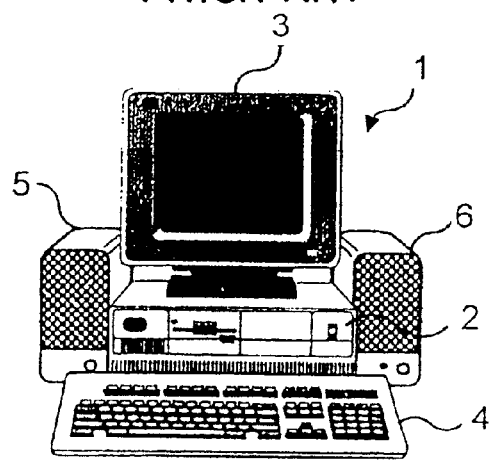
FIG. 1 is a view, showing the construction of a conventional personal computer.
Figure 2:
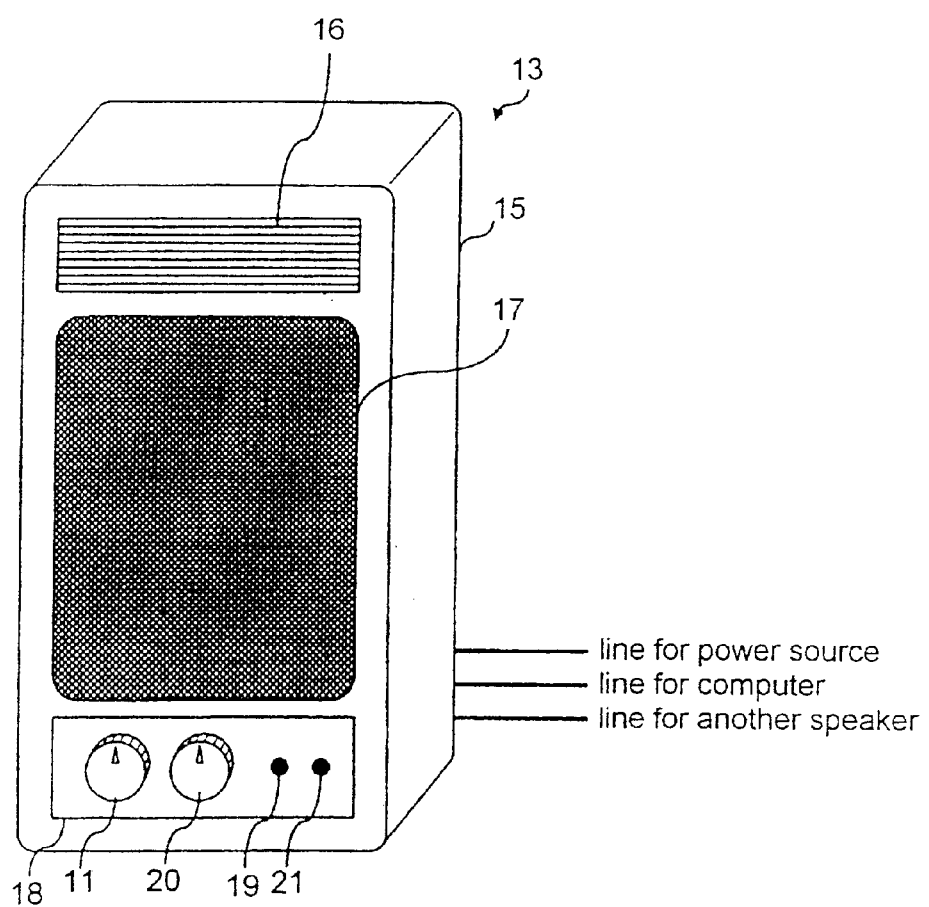
FIG. 2 is a perspective view, showing the appearance of one speaker constituting the speaker system for personal computers in accordance with the preferred embodiment of the present invention.
Figure 3:
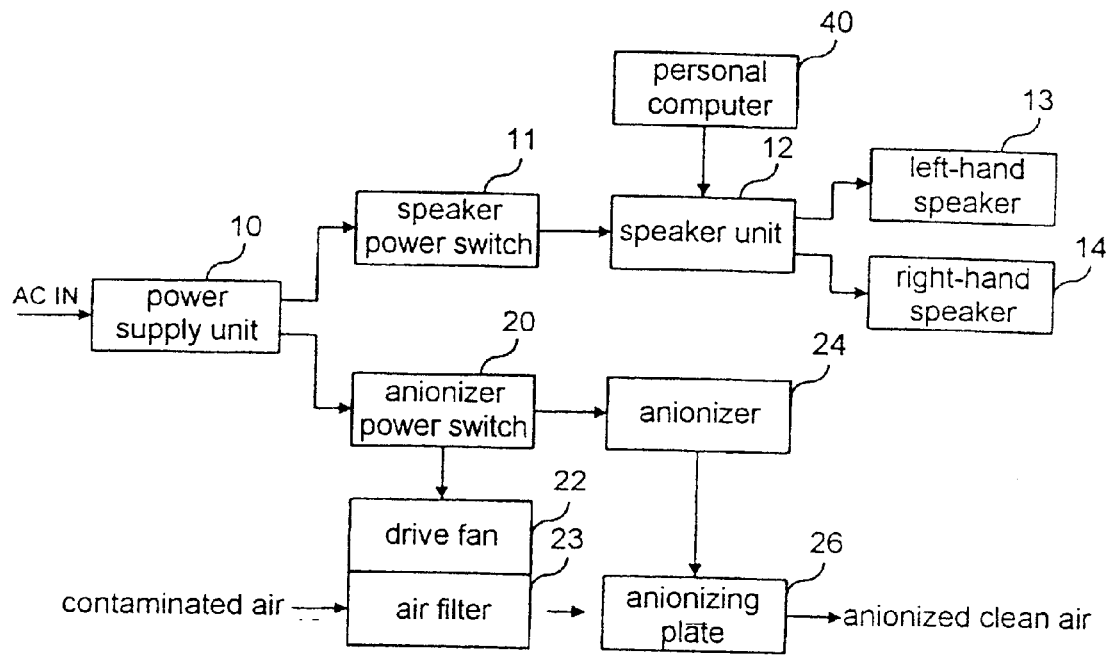
FIG. 3 is a block diagram, showing the construction of the speaker system for computers provided with both an air filter and an anionizer in accordance with the preferred embodiment of the present invention.

FIG. 2 is a perspective view, showing the appearance of one speaker constituting the speaker system for computers in accordance with the preferred embodiment of the present invention. FIG. 3 is a block diagram, showing the construction of the speaker system for computers provided with both an air filter and an anionizer according to this invention.

As shown in the drawings, the speaker system of this invention comprises a speaker unit 12 consisting of two or more speakers 13 and 14. The speaker unit 12 amplifies audio signals, output from a personal computer, to predetermined levels and stereophonically divides the amplified audio signals, and outputs sounds having an audio frequency. The two speakers 13 and 14 of the speaker unit 12 may be laid on a support surface at the left- and right-hand sides of the computer or may be integrally set within a monitor at the left- and right-hand sides. The speakers 13 and 14 are preferably designed to output stereophonically divided sounds or Dolby surround sounds.

The speaker system of this invention also has a power supply unit 10, which is used for supplying electric power for the speaker while converting and rectifying an input AC voltage into a desired level of DC voltage. In such a case, the level of DC voltage output from the power supply unit 10 may vary in accordance with elements required to drive the speaker system. The above power supply unit 10 may be provided with an adapter capable of converting the outside AC voltage into the desired level of DC voltage or of reducing the voltage. Alternatively, the power supply unit 10 may comprise an independent adaptor.

A speaker power switch 11 is provided on the front wall of the speaker 13 for turning on or off the electric power from the power supply unit 10 to selectively activate the speaker system and for controlling output sound volume of the speaker system as desired. That is, it is possible to easily control the output sound volume of the speakers 13 and 14 using the speaker power switch 11. Of course, it should be understood that the speaker system of this invention may be separately provided with a power switch and a volume switch.

An anionizer 24 is mounted on a printed circuit board 30 within the speaker and generates anions from its anionizing plate 26. The anionizing plate 26 consists of one anode plate 33 and a cathode plate 32 individually generating a high voltage.

An anionizer power switch 20 is provided on the speaker for turning on or off the anionizer 24 so as to selectively generate the desired anions.

A drive fan 22 is provided within the speaker and rotated at a predetermined rpm when the speaker is turned on. This drive fan 22 thus generates sucking force for forcibly sucking atmospheric air into the cabinet of the speaker.

An air filter 23 is installed around the drive fan 22 within the speaker so as to filter off impurities from the sucked atmospheric air. The filter 23 is preferably made of a fabric, paper or plastic material. In order to improve the filtering effect of the filter 23, it is preferable to use one or more filters while overlapping the filters or to use a filter having micro pores. It is also preferable to use a washable filter as the filter 23 or use an inexpensive filter that does not increase the maintenance cost of the filter 23.

As described above, the anionizer 24 is mounted on the PCB 30 within the speaker and is used for generating desired anions from its anionizing plate 26, which consists of one cathode plate 32 and one anode plate 33 individually generating a high voltage. As well known to those skilled in the art, an ion is an electrically charged atom or group of atoms formed by the loss or gain of one or more electrons, and is created by an ionization of an atom or group of atoms. Such ions are not electroneutral substances. Of the ions, cations (positive ions) are created by an electron loss and are attracted to the cathode in electrolysis, while anions (negative ions) are created by an electron gain and are attracted to the anode. The valence of an ion is equal to the number of electrons lost or gained and is indicated by a plus sign for cations and a minus sign for anions.

An anionized atmosphere refreshes people in mind and body as expected when they take a walk on a field after a storm, stand in a waterfall or walk in a pine-grove. Such refreshing, expected from the anionized atmosphere, is caused by water drops, which come into strong collision with surfaces in air to be decomposed and generate a great amount of oxygen ions charged with negative electric charge due to an ionization of air (Lenard's phenomenon), with water drops having positive electricity and air having negative electricity.

Such anions have an air cleaning effect, a dust collection effect and a sterilization effect in addition to a neutralization effect for harmful cations. The anions are negatively charged atoms of air, and desirably give an effect of limpid blood, a nervous rest, recruitment, improvement of appetite and promotion of active cells to people, thus allowing people to feel refreshed and infusing vitality into people.

In the speaker system of this invention, the cathode plate 32 of the anionizing plate 26 is designed to absorb heat generated from an audio signal amplifying chip 35 and to dissipate the heat to the surroundings, thus minimizing a resistance value of the audio signal amplifying chip 35 caused by a heat dissipation from the chip 35 and finally improving tone quality of the speakers 13 and 14. The audio signal amplifying chip 35 has a heat dissipation plate 36, which holds the chip 35 and dissipates heat from the chip 35. The above heat dissipation plate 36 is mounted to the cathode plate 32 of the anionizing plate 26, and so heat from the chip 35 is transferred to the cathode plate 32 through the heat dissipation plate 36.

In the speaker system, the cabinet 15 of the speaker is provided with a power display 19 for displaying an application of electric power for the speaker, an anionizer display 21 for displaying an operational state of the anionizer 24, and a ventilation grille 16 for allowing atmospheric air to be sucked into the cabinet 15 of the speaker by the suction force of the drive fan 22. In the above-mentioned preferred embodiment, the speaker system is provided with both the air filter 23 and the anionizer 24 within the cabinet 15 of the speaker. However, it should be understood that the speaker system may be provided with either the air filter 23 or the anionizer 24. In addition, the air filter 23, the drive fan 22 and the anionizer 24 may be provided in each of the speakers 13 and 14 of the speaker unit 12 or may be provided in either one of the speakers 13 and 14.

As shown in FIG. 2, the speaker has a first line extending to the power source, a second line extending to the personal computer and transmitting audio signals from the computer to the speaker, and a third line extending to the other speaker and allowing the two speakers 13 and 14 to output stereophonically divided sounds.

A speaker cover 17 covers the front wall of the cabinet 15 of each of the speakers 13 and 14 so as to prevent an undesirable introduction of dust to the amplifier 34 within the cabinet 15. The speaker cover 17 is preferably made of iron wires, a fabric, or a plastic material. A control panel 18 is provided on the front wall of the cabinet 15 of the speaker at a lower position under the speaker cover 17 and is used for controlling the operation of the speaker system.

The speaker system of this invention is operated as follows. When a user turns on the power switch 11 of the speaker, the speakers 13 and 14 of the speaker unit 12 output stereophonically divided sounds in response to a variety of audio signals output from the personal computer.

When the user operates the personal computer for a lengthy period of time within limited working space having a problem of bad ventilation, air may be contaminated with smoke and germs and may suffer a lack of oxygen, and gives ill-effect to the user's health. In such a case, it is necessary to filter off impurities from the contaminated air using the air filter 23 and to anionize the air using the anionizer 24, and to provide anionized clean air. In such a case, the anionizer power switch 20, provided on the control panel 18 of the speaker's cabinet 15, is turned on to start the drive fan 22 by the electric power from the power supply unit 10, thus generating suction force. The contaminated air is thus sucked into the cabinet 15 through the ventilation grille 16 and primarily filtered by the air filter 23.

In such a case, the air filter 23 filters off dust, micro germs and floating micro solid substances from the air. The air from the filter 23 secondarily passes through the anionizing plate 26 mounted on the PCB 30, thus being laden with anions formed by an anionization of the air performed by the high voltages of the anode plate 33 and the cathode plate 32 of the anionizing plate 26.

Figure 4:
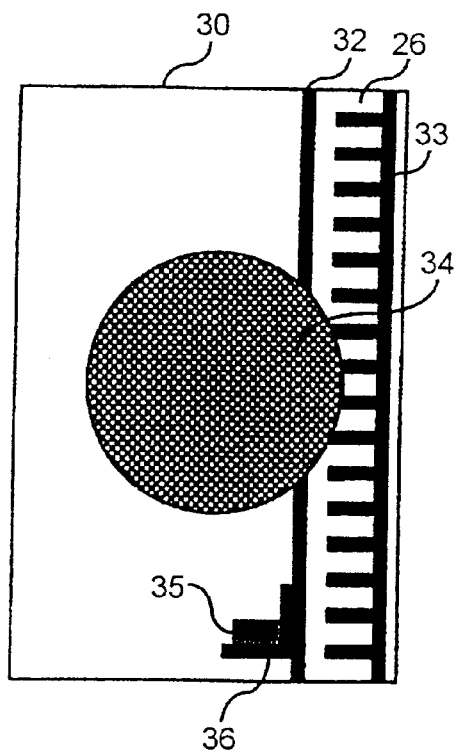
FIG. 4 is a view, showing a printed circuit board (PCB) set within the speaker of this invention, with both an anionizing plate of the anionizer and an audio signal amplifying chip being mounted on the PCB.

As shown in FIG. 4, the amplifier 34 may be mounted on the PCB 30 within the cabinet 15 or may be mounted on the front wall of the cabinet 15 and amplifies the audio signals output from the personal computer. The cathode plate 32 of the anionizing plate 26 generates a high voltage and absorbs heat from surroundings. In the speaker system of this invention, the audio signal amplifying chip 35, used for amplifying the voltage of the amplifier 34, is mounted to the cathode plate 32, and so the cathode plate 32 effectively absorbs heat dissipated from the chip 35 and eliminates noises of the speakers caused by the thermal resistance due to heat dissipated from the chip 35. Therefore, it is possible to improve the tone quality of the speakers 13 and 14.

Figure 5:
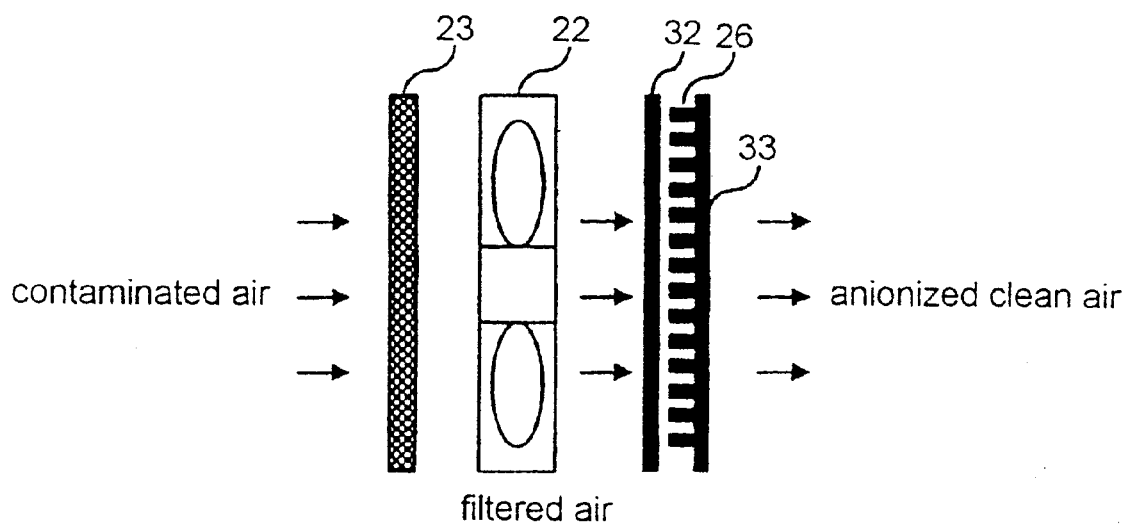
FIG. 5 is a view, schematically showing the operational effect of the speaker system of this invention when contaminated atmospheric air is filtered and anionized within the speaker and is discharged from the speaker to the outside of the speaker.

As shown in FIG. 5, contaminated air is sucked into the speaker's cabinet 15 through the ventilation grille 16 of the cabinet 15 due to the suction force generated by the drive fan 22. Within the cabinet 15, the contaminated air passes through the anionizing plate 26 of the anionizer 24, thus being anionized prior to being discharged to the atmosphere outside the cabinet 15. Therefore, even when a user operates a personal computer for a lengthy period of time within limited working space having a problem of bad ventilation, with air within the limited working space being contaminated with smoke and germs and lacking oxygen, the speaker system of this invention provides anionized and filtered clean air, and allows a user to operate the computer under a refreshed atmosphere.

As described above, the present invention provides a speaker system for personal computers. This speaker system is designed to suck contaminated air from limited working space and to filter off impurities from the air using an air filter, thus cleaning the contaminated air. The speaker system also has an anionizer designed to anionize the filtered air, thus preparing filtered and anionized clean air to a user of a computer and effectively preventing user's health from being ill-affected by such contaminated air. Therefore, the speaker system allows a user to operate the computer under the refreshed atmosphere, thus finally improving work efficiency while operating the computer.

In the speaker system of this invention, the audio signal amplifying chip is mounted to a cathode plate of the anionizer, with the cathode plate being capable of desirably absorbing heat using a high voltage. The speaker system thus effectively cools the audio signal amplifying chip and minimizes the resistance value of the chip caused by an undesirable heat dissipation from the chip, thus being finally improved in its tone quality and being improved in its operational function.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A speaker system for personal computers, comprising:
   at least one speaker amplifying audio signals, output from a personal computer, to predetermined levels and stereophonically dividing the amplified audio signals, and outputting sounds having an audio frequency;
   a power supply unit used for supplying electric power for the speaker while converting and rectifying an input AC voltage into a desired level of DC voltage;
   a speaker power switch provided on a cabinet of said speaker for turning on or off the electric power for the speaker so as to selectively activate the speaker or for controlling output sound volume of the speaker;
   a drive fan provided within the speaker and rotated at a predetermined rpm when the speaker is turned on, said drive fan thus generating sucking force for forcibly sucking atmospheric air into the speaker; and
   an air filter installed around said drive fan within the speaker so as to filter off impurities from the sucked atmospheric air.

2. The speaker system according to claim 1, further comprising:
   an anionizer mounted on a printed circuit board within the speaker and adapted for generating anions from its anionizing plate, said anionizing plate consisting of an anode plate and a cathode plate individually generating a high voltage; and
   an anionizer power switch provided on the cabinet of said speaker for turning on or off the anionizer so as to selectively generate the anions.

3. The speaker system according to claim 2, wherein said cathode plate of the anionizing plate is designed to absorb heat generated from an audio signal amplifying chip and to dissipate the heat to the surroundings, thus minimizing a resistance value of said audio signal amplifying chip caused by a heat dissipation from said chip and finally improving tone quality of the speakers.

4. The speaker system according to claim 2, wherein the cabinet of said speaker is provided with a power display for displaying an application of electric power for the speaker, an anionizer display for displaying an operational state of said anionizer, and a ventilation grille for allowing the atmospheric air to be sucked into the cabinet of the speaker by the suction force of the drive fan.

5. A speaker system for personal computers, comprising:

at least one speaker amplifying audio signals, output from a personal computer, to predetermined levels and stereophonically dividing the amplified audio signals, and outputting sounds having an audio frequency;

a power supply unit used for supplying electric power for the speaker while converting and rectifying an input AC voltage into a desired level of DC voltage;

a speaker power switch provided on said speaker for turning on or off the electric power for the speaker so as to selectively activate the speaker;

an anionizer mounted on a printed circuit board within the speaker and adapted for generating anions from its anionizing plate, said anionizing plate consisting of an anode plate and a cathode plate individually generating a high voltage;

an anionizer power switch provided on said speaker for turning on or off the anionizer so as to selectively generate the anions; and a drive fan provided within the speaker and rotated at a predetermined rpm when the speaker is turned on, said drive fan thus generating sucking force for forcibly sucking atmospheric air into the speaker.

* * * * *